(12) United States Patent
Lee et al.

(10) Patent No.: US 11,413,933 B2
(45) Date of Patent: Aug. 16, 2022

(54) THERMAL MANAGEMENT SYSTEM FOR ELECTRIC VEHICLE

(71) Applicants: Hyundai Motor Company, Seoul (KR); Kia Motors Corporation, Seoul (KR)

(72) Inventors: Sang Shin Lee, Gyeonggi-do (KR); Man Ju Oh, Gyeonggi-do (KR); So La Chung, Seoul (KR); Jae Woong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 178 days.

(21) Appl. No.: 16/591,130

(22) Filed: Oct. 2, 2019

(65) Prior Publication Data
US 2020/0338955 A1   Oct. 29, 2020

(30) Foreign Application Priority Data
Apr. 25, 2019   (KR) .......................... 10-2019-0048225

(51) Int. Cl.
*B60H 1/00* (2006.01)
*B60H 1/32* (2006.01)
(Continued)

(52) U.S. Cl.
CPC ........... *B60H 1/00764* (2013.01); *B60H 1/00* (2013.01); *B60H 1/00278* (2013.01);
(Continued)

(58) Field of Classification Search
CPC ............. B60H 1/00764; B60H 1/3205; B60H 1/143; B60H 1/2225; B60H 1/00; B60H 1/00328; B60H 1/3228; B60H 1/00457; B60H 1/00885; B60H 2001/00128; B60H 2001/003; B60H 1/00278; B60H 1/3208;
(Continued)

(56) References Cited

U.S. PATENT DOCUMENTS

| 5,528,900 A * | 6/1996 | Prasad | ................. B60H 1/2215 |
| | | | 62/175 |
| 7,096,935 B2 * | 8/2006 | Ieda | ................. H01M 8/04358 |
| | | | 165/202 |

(Continued)

FOREIGN PATENT DOCUMENTS

| DE | 102010037128 A1 * | 3/2012 | ............... H05B 3/44 |
| KR | 101416357 B1 | 7/2014 | |

(Continued)

*Primary Examiner* — Ljiljana V. Ciric
(74) *Attorney, Agent, or Firm* — Fox Rothschild LLP

(57) ABSTRACT

A thermal management system for an electric vehicle includes an interior air conditioning part including an air inflow part, an air discharge part, a cooling core, a heating core arranged between the cooling core and the air discharge part, and an adjustment door. The adjustment door is selectively adjustable to control whether air from the cooling core may flow into the heating core. A heat transfer line connects an electric part core to the heating core for transferring that heat of the electric part to the heating core, in order to allow heat dissipation of the electric part through the heating core.

13 Claims, 7 Drawing Sheets

(51) Int. Cl.
  *B60H 1/14* (2006.01)
  *B60H 1/22* (2006.01)

(52) U.S. Cl.
  CPC ..... *B60H 1/00328* (2013.01); *B60H 1/00457* (2013.01); *B60H 1/00885* (2013.01); *B60H 1/143* (2013.01); *B60H 1/2225* (2013.01); *B60H 1/3205* (2013.01); *B60H 1/3208* (2013.01); *B60H 1/3228* (2019.05); *B60H 2001/003* (2013.01); *B60H 2001/00128* (2013.01)

(58) Field of Classification Search
  CPC ...... B60H 2001/225; B60H 2001/2253; B60H 1/2218; B60H 2001/00178; B60H 1/0005; B60H 1/00392; B60H 1/00271; B60H 1/00507; B60H 1/0065; B60H 1/00849; B60H 1/3229
  See application file for complete search history.

(56) References Cited

U.S. PATENT DOCUMENTS

| | | | | |
|---|---|---|---|---|
| 7,159,651 | B2* | 1/2007 | Ito | B60H 1/00007 165/202 |
| 8,973,386 | B2* | 3/2015 | Favaretto | H01M 10/625 180/65.6 |
| 9,517,677 | B2* | 12/2016 | Tokuda | B60L 1/003 |
| 9,643,469 | B2* | 5/2017 | Kakehashi | B60H 1/04 |
| 10,752,078 | B2* | 8/2020 | Ito | B60H 1/00985 |
| 2006/0137853 | A1* | 6/2006 | Haller | B60H 1/32281 165/42 |
| 2008/0006394 | A1* | 1/2008 | Gupta | F01N 5/02 165/104.21 |
| 2011/0000241 | A1* | 1/2011 | Favaretto | B60H 1/00271 165/104.21 |
| 2011/0120146 | A1* | 5/2011 | Ota | B60H 1/03 62/3.3 |
| 2012/0079835 | A1* | 4/2012 | Oh | B60H 1/00428 62/3.2 |
| 2013/0228320 | A1* | 9/2013 | El-Saghir Selim | B60H 1/00571 165/177 |
| 2014/0182319 | A1* | 7/2014 | Hunt | F25B 27/00 62/238.1 |
| 2017/0080778 | A1* | 3/2017 | Suzuki | B60H 1/0075 |
| 2017/0096048 | A1* | 4/2017 | Larson | B60H 1/00785 |
| 2017/0129309 | A1* | 5/2017 | Lee | F25B 6/02 |
| 2017/0151857 | A1* | 6/2017 | Suzuki | B60H 1/00021 |
| 2017/0274725 | A1* | 9/2017 | Miyakoshi | B60H 1/00921 |
| 2017/0282689 | A1* | 10/2017 | Miyakoshi | B60H 1/00921 |
| 2017/0326943 | A1* | 11/2017 | Ishizeki | B60H 1/00921 |
| 2018/0065451 | A1* | 3/2018 | Choi | B60H 1/3213 |
| 2019/0070924 | A1* | 3/2019 | Mancini | B60H 1/00907 |
| 2019/0168579 | A1* | 6/2019 | Kim | B60H 1/00007 |
| 2019/0225050 | A1* | 7/2019 | Kang | F25B 49/02 |
| 2019/0255911 | A1* | 8/2019 | Suzuki | B60H 1/0075 |
| 2020/0086714 | A1* | 3/2020 | Dhar | B60H 1/00885 |
| 2020/0122544 | A1* | 4/2020 | Ishizeki | B60H 1/143 |
| 2020/0130466 | A1* | 4/2020 | Imaizumi | B60H 1/248 |
| 2020/0130467 | A1* | 4/2020 | Imaizumi | B60H 1/00849 |
| 2021/0108841 | A1* | 4/2021 | Sugimura | B60L 3/0023 |
| 2021/0245572 | A1* | 8/2021 | Hwang | B60H 1/32284 |
| 2021/0252941 | A1* | 8/2021 | Higuchi | B60H 1/00899 |

FOREIGN PATENT DOCUMENTS

| | | |
|---|---|---|
| KR | 101436960 B1 | 9/2014 |
| KR | 101875651 B1 | 7/2018 |
| WO | WO 2017-003504 A1 * | 1/2017 |

* cited by examiner

THERMAL MANAGEMENT SYSTEM FOR ELECTRIC VEHICLE

CROSS REFERENCE TO RELATED APPLICATION

The present application claims under 35 U.S.C. § 119(a) the benefit of Korean Patent Application No. 10-2019-0048225 filed on Apr. 25, 2019, the entire contents of which are incorporated by reference herein.

BACKGROUND

(a) Technical Field

The present disclosure relates to a thermal management system for an electric vehicle, which may adjust the temperature of an interior space of the electric vehicle, and cool an electric part in a thermal management field of the electric vehicle.

(b) Description of the Related Art

In the conventional thermal management field of an electric vehicle, in order to adjust the temperature of an electric part such as a motor or an inverter and the interior temperature of the electric vehicle, typically the temperature of the electric part and the interior temperature of the vehicle are controlled through a separate thermal management system, respectively. Conventionally, there has been a problem in that in order to prepare such a separate thermal management system, a large number of parts are required, and occupy a lot of spaces inside the electric vehicle.

FIG. 1 (RELATED ART) is a graph illustrating a heating value of a conventional electric part of an electric vehicle. In FIG. 1, the horizontal axis represents a traveling time, and the vertical axis represents a heating value of the electric part. In this case, the electric vehicle generates the largest heating value of the electric part during a rapid acceleration traveling time, and the heating value of the electric part during the acceleration traveling time or the fastest traveling time is smaller than the rapid acceleration traveling time. Therefore, a required amount of instantaneous cooling of electric parts is large at an intermittent short moment (rapid acceleration section), but in most cases, the required amount of cooling is small. The conventional electric vehicle has been prepared with a separate thermal management system equipped with a radiator, etc. in addition to a system for interior air conditioning in order to meet the required cooling specification of the electric part in the rapid acceleration section. As described above, there has been a problem in that in order to prepare such a separate thermal management system, a large number of parts are required, and occupy a lot of spaces inside the vehicle.

Therefore, a new approach to the thermal management system for the electric vehicle is needed to solve the problems.

The foregoing explained as the background is intended merely to aid in the understanding of the background of the present disclosure, and is not intended to mean that the present disclosure falls within the purview of the related art that is already known to those skilled in the art.

SUMMARY

An object of the present disclosure is to provide a thermal management system for an electric vehicle, where the thermal management system is configured to adjust the temperature of an interior space of a vehicle, and cool an electric part in a thermal management field of the vehicle.

A thermal management system for an electric vehicle according to the present disclosure for achieving the object may include an interior air conditioning part including an air inflow part, an air discharge part, a cooling core, a heating core arranged between the cooling core and the air discharge part, and an adjustment door for selectively adjusting whether air having passed through the cooling core flows into the heating core prepared therein; and a heat transfer line having first and second sides respectively connected to an electric part core and the heating core to be heat-transferrable, so that heat of the electric part is transferred to the heating core, thereby allowing the electric part to dissipate the heat through the heating core.

The air inflow part of the interior air conditioning part may receive exterior air or interior air of the electric vehicle, and the air discharge part may be connected with an interior space of the vehicle or an exterior of the vehicle.

The cooling core may comprise an evaporator and connected with a refrigerant line including a compressor, a condenser, and an expansion valve.

The heating core may comprise a radiator and connected to a first coolant line including a first pump and an electric heater.

The heat transfer line may comprise a heat pipe.

The heating core may be disposed above the electric vehicle as compared with the electric part with respect to a height direction of the electric vehicle.

The heat transfer line may be arranged with a second pump and comprise a second coolant line connected to the heating core, and the electric part core may be disposed in the second coolant line so that the heat of the electric part is transferred to the heating core.

The thermal management system for the electric vehicle may further include a heat exchanger arranged between the cooling core and the heating core of the interior air conditioning part, and the heat transfer line may have the first and second sides respectively connected to the electric part core and the heat exchanger to be heat-transferrable, so that the heat of the electric part is transferred to the heat exchanger, thereby allowing the electric part to dissipate the heat through the heat exchanger.

A flow space may be formed at the side of the heating core of the interior air conditioning part, and the air may pass through the cooling core and then flow to the air discharge part only through the flow space, the air may pass through the cooling core and then flow to the air discharge part only through the heating core, or the air may pass through the cooling core and then flow to the air discharge part through the flow space and the heating core according to control of the adjustment door.

The cooling core may comprise an evaporator and be arranged in a refrigerant line including a compressor, a condenser, and an expansion valve, and the thermal management system for the electric vehicle may further include an integrated control part for controlling an operation of the refrigerant line or the first coolant line and an operation of the adjustment door.

When a heating value of the electric part is equal to or greater than a certain value, the integrated control part may control the adjustment door so that the air having passed through the cooling core flows into the heating core.

When the cooled air is discharged into the interior space of the vehicle, the integrated control part may control the refrigerant line to operate.

When a heating value of the electric part is smaller than a certain value and the heated air is discharged into the interior space of the vehicle, the integrated control part may control the adjustment door so that the air having passed through the cooling core flows into the heating core, and control the first coolant line to operate.

When the heating value of the electric part is changed to the certain value or more, the integrated control part may control a first refrigerant line not to operate.

When a heating value of the electric part is smaller than a certain value and the cooled air is discharged into the interior space of the vehicle, the integrated control part may control the adjustment door so that the air having passed through the cooling core does not flow into the heating core, and control the refrigerant line to operate.

According to the thermal management system for the electric vehicle of the present disclosure, it is possible to adjust the temperature of the interior space of the vehicle, and cool the electric part.

Particularly, since the waste heat of the electric part may be used, it is possible to increase the thermal efficiency of the electric vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
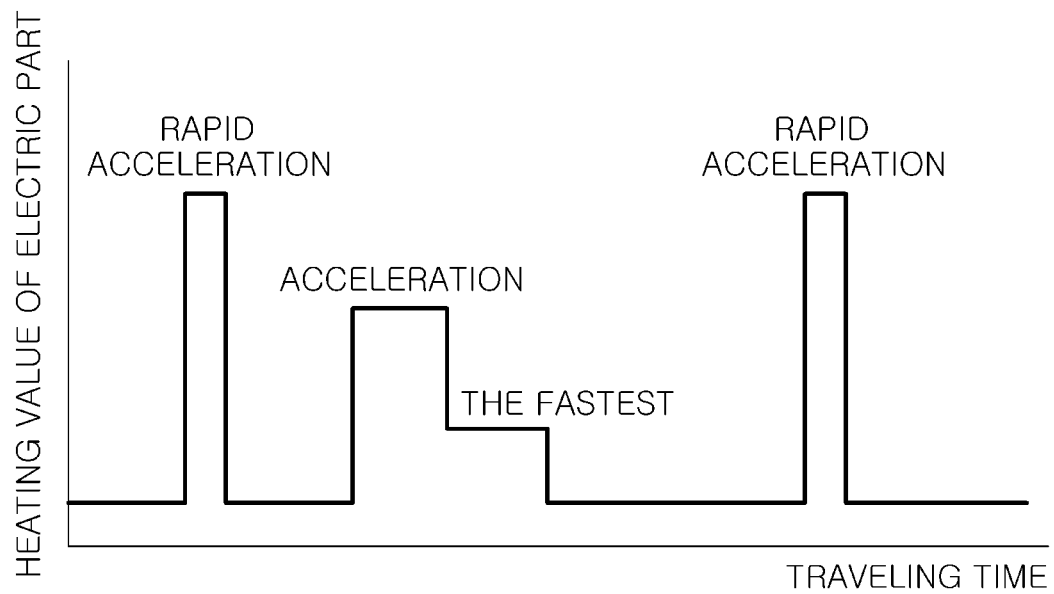
FIG. 1 (RELATED ART) is a graph illustrating a heating value of a conventional electric part of an electric vehicle.
Figure 2:
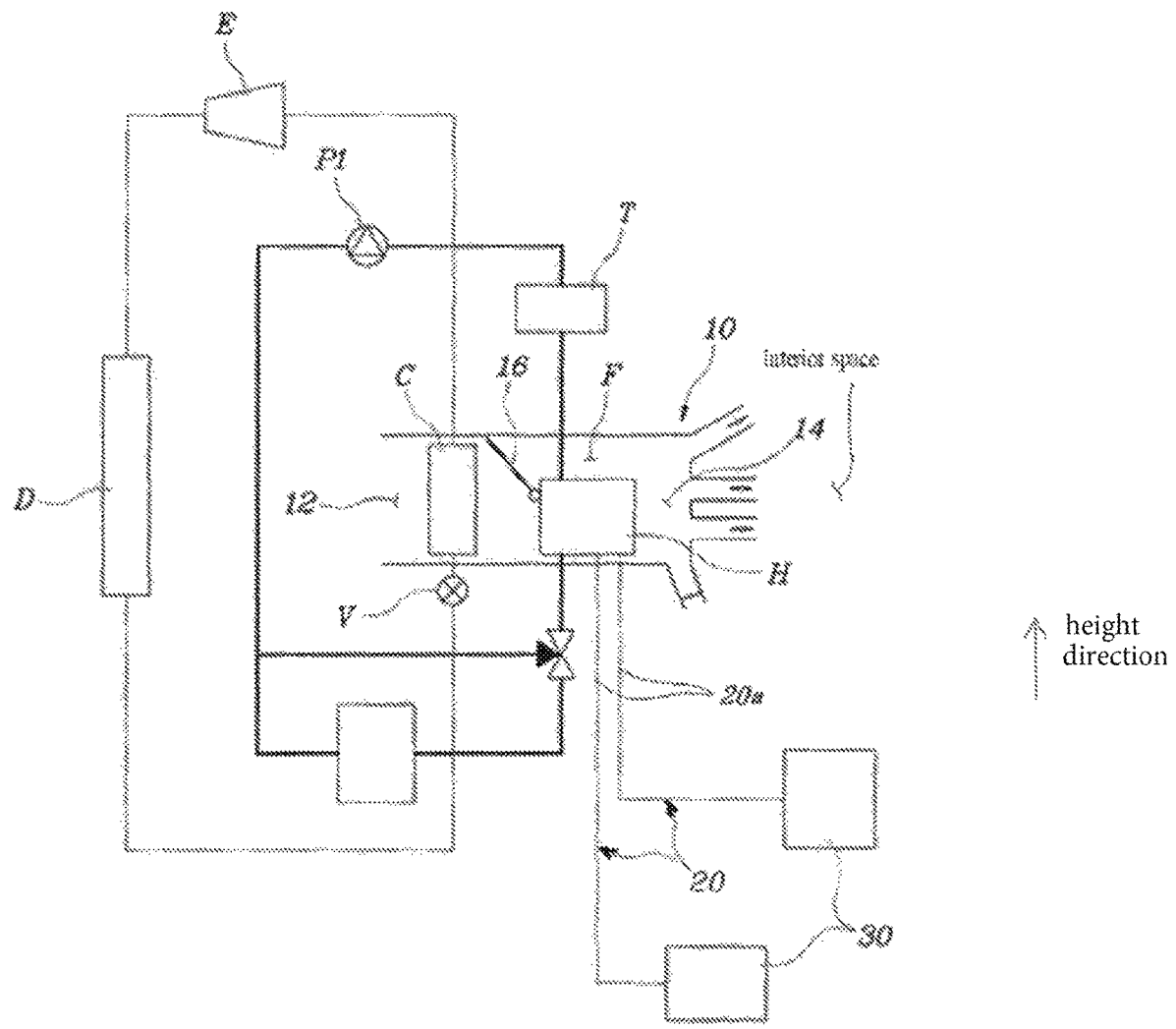
FIG. 2 is a diagram illustrating a thermal management system for an electric vehicle according to an embodiment of the present disclosure.
Figure 3:
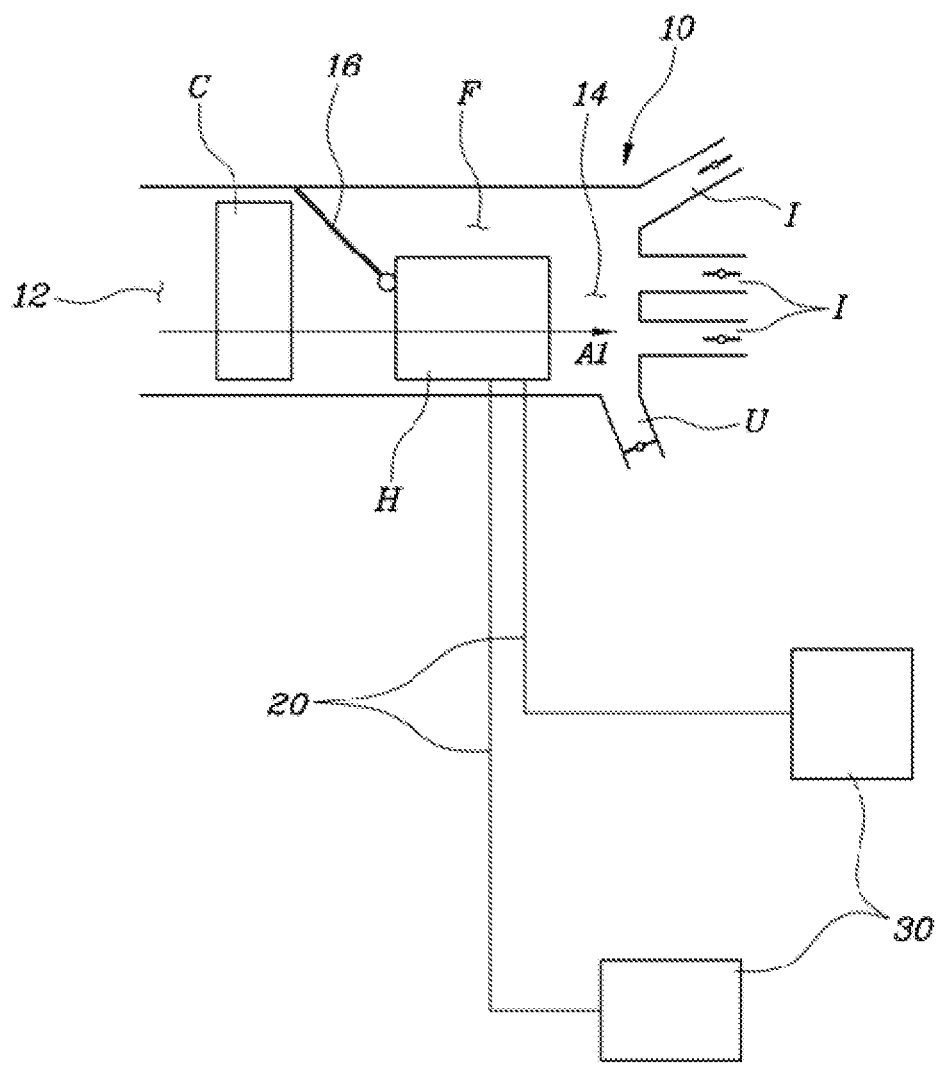
FIG. 3 is a diagram illustrating an interior air conditioning part of the thermal management system for the electric vehicle according to an embodiment of the present disclosure.
Figure 4:
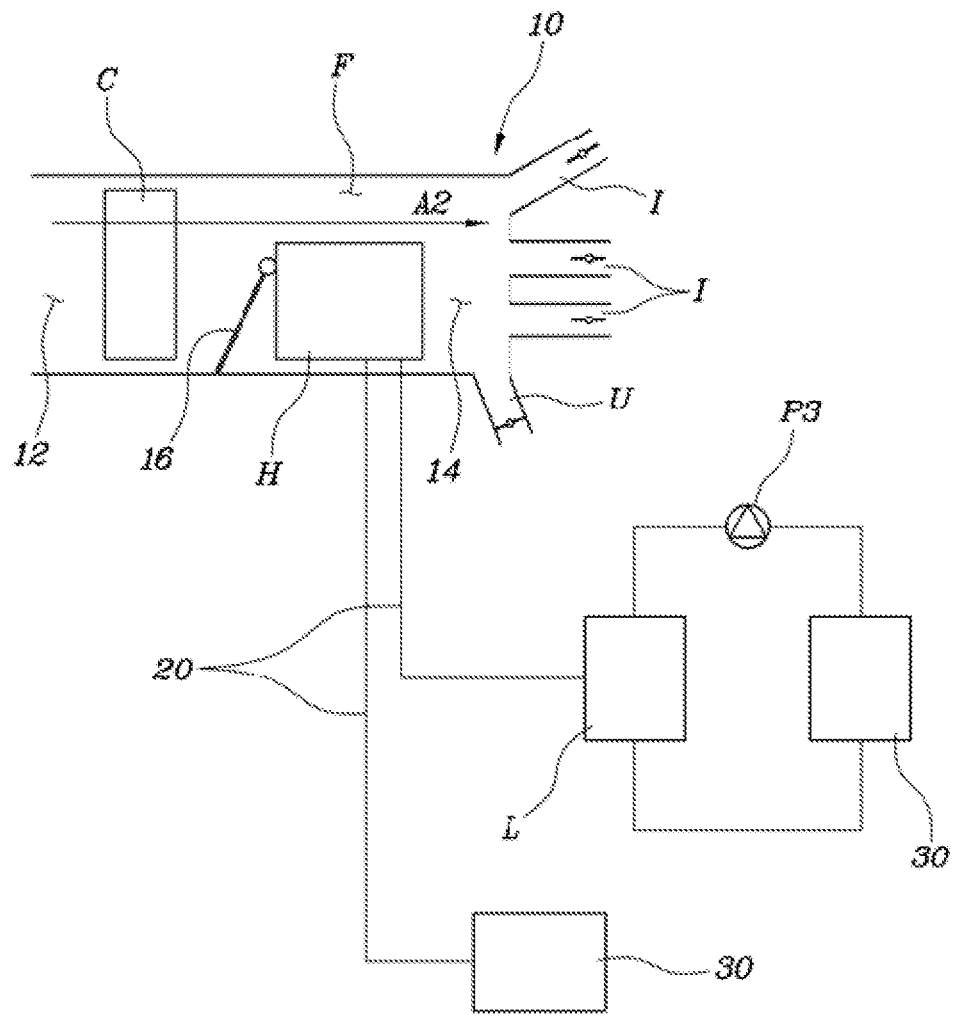
FIGS. 4 to 6 are diagrams illustrating the thermal management system for the electric vehicle according to another embodiment of the present disclosure.
Figure 5:
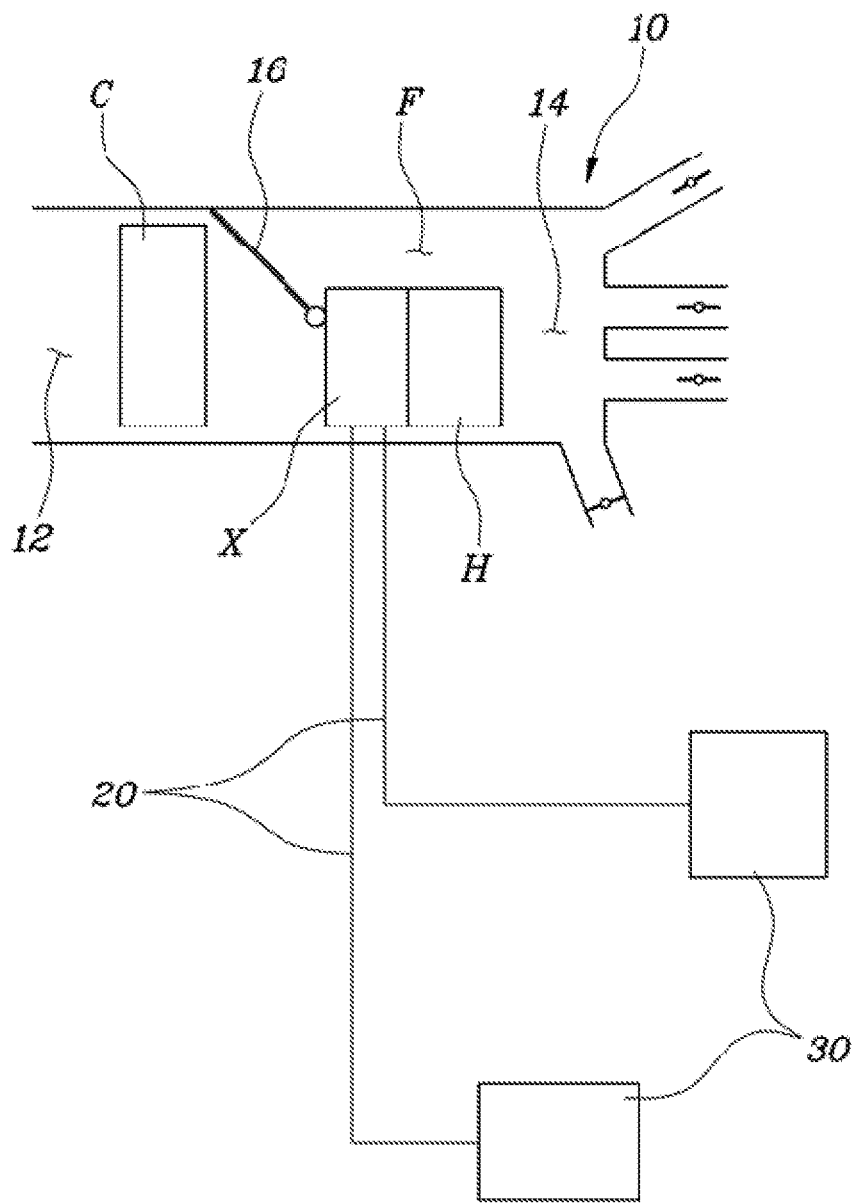
Figure 6:
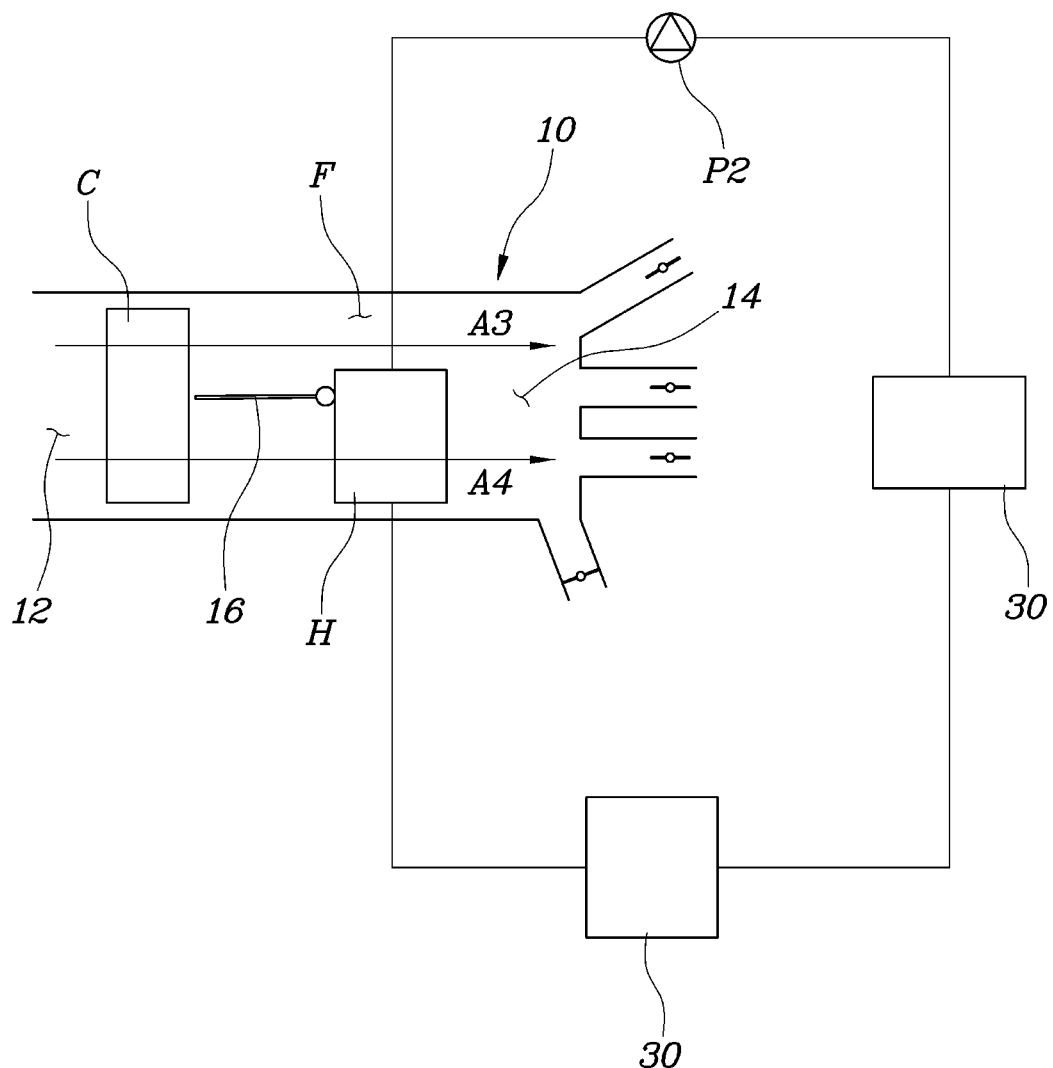
Figure 7:
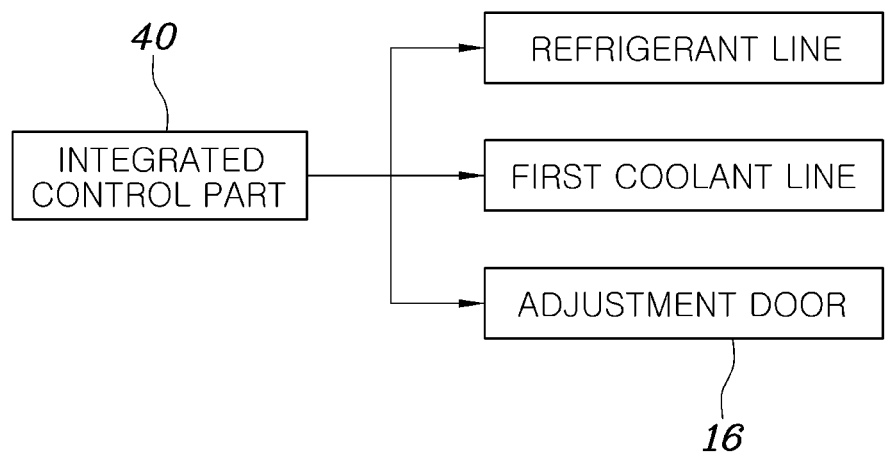
FIG. 7 is a diagram illustrating an integrated control part of the thermal management system for the electric vehicle according to an embodiment of the present disclosure.

FIG. 2 is a diagram illustrating a thermal management system for an electric vehicle according to an embodiment of the present disclosure, FIG. 3 is a diagram illustrating an interior air conditioning part of the thermal management system for the electric vehicle according to an embodiment of the present disclosure, FIGS. 4 to 6 are diagrams illustrating the thermal management system for the electric vehicle according to another embodiment of the present disclosure, and FIG. 7 is a diagram illustrating an integrated control part of the thermal management system for the electric vehicle according to an embodiment of the present disclosure.

Referring to FIG. 2, a thermal management system for an electric vehicle according to the present disclosure includes an interior air conditioning part 10 including an air inflow part 12, an air discharge part 14, a cooling core C, a heating core H arranged between the cooling core C and the air discharge part 14, and an adjustment door 16 for selectively adjusting whether air having passed through the cooling core C flows into the heating core H; and a heat transfer line 20 having first and second sides connected to an electric part core and the heating core H, respectively, to be heat-transferable so that heat of an electric part 30 is transferred to the heating core H, thereby allowing the electric part 30 to dissipate the heat through the heating core H.

More specifically, the air inflow part 12 of the interior air conditioning part 10 may receive exterior air or interior air of the vehicle, and the air discharge part 14 may be connected with an interior space of the vehicle or an exterior of the vehicle.

According to the present disclosure, the interior air conditioning part 10 is provided. The interior air conditioning part 10 is arranged with the air inflow part 12 and the air discharge part 14. The exterior air or the interior air of the vehicle flows into the interior air conditioning part 10 through the air inflow part 12. Then, the air discharge part 14 arranged in the interior air conditioning part 10 is connected with the interior space of the vehicle or the exterior of the vehicle. Therefore, the air flowing into the interior air conditioning part 10 through the air inflow part 12 may be discharged into the interior space of the vehicle or the exterior of the vehicle through the air discharge part 14. In this case, referring to FIGS. 2 and 3, the air discharge part may be connected with the interior space of the vehicle or the exterior of the vehicle through a duct I connected to the interior space of the vehicle and a duct U connected to the exterior of the vehicle. In addition, the duct I connected to the interior space of the vehicle is arranged in plural and the air having passed through the interior air conditioning part may be variously discharged into a seat back, a seat cushion, a roof vent, a floor part, or a windshield, etc., respectively. In addition, a door, etc. is arranged in the duct I to open and close each duct, and a mode in which each duct I may discharge may be performed variously. Then, the air having passed through the interior air conditioning part may be immediately discharged into the exterior of the vehicle through the duct U connected with the exterior of the vehicle. Even in this case, a door, etc. may be arranged in the duct U to open and close the duct U.

Meanwhile, the interior air conditioning part 10 of the present disclosure is arranged with the cooling core C and the heating core H between the cooling core C and the air discharge part 14. The cooling core C cools the exterior air or the interior air of the vehicle passing through the cooling core C during operation. Then, the heating core H heats the air passing through the heating core H during operation.

In addition, the present disclosure is arranged with an adjustment door 16. The adjustment door 16 selectively adjusts whether the air having passed through the cooling core C flows into the heating core H. For example, as shown in FIG. 3, the adjustment door 16 may allow the air having passed through the cooling core C to flow into the heating core H (path "A1"). Then, as shown in FIG. 4, the adjustment door 16 may prevent the air having passed through the cooling core C from flowing into the heating core H. In this case, the air flowing into the interior air conditioning part 10 does not flow into the heating core H and is moved to the air discharge part (path "A2"). In addition, as shown in FIG. 6, the adjustment door 16 may allow a part of the air having passed through the cooling core C to flow into the heating core H (path "A4") and prevent the remainder from flowing into the heating core H (path "A3"). In this case, the cooled air and the heated air may be mixed and discharged into the interior space of the vehicle. Therefore, the adjustment door 16 opens and closes the heating core H to control the path through which the air moves inside the interior air conditioning part 10. The adjustment door 16 may be arranged between the cooling core C and the heating core H. However, in the present disclosure, the position of the adjustment door 16 is not limited between the cooling core C and the heating core H, and it is apparent that the position of the adjustment door 16 may be arranged anywhere if it is a position capable of controlling the path through which the air inside the interior air conditioning part 10 as described above moves.

Then, the present disclosure is arranged with the heat transfer line 20. The heat transfer line 20 has first and second sides connected to the electric part core and the heating core H, respectively, to be heat-transferable so that heat of the electric part 30 is transferred to the heating core H, thereby allowing the electric part 30 to dissipate the heat through the heating core H. The electric part 30 is a concept including a motor or an inverter, etc.

The conventional electric vehicle has required the thermal management system having a separate radiator for heat-dissipating the electric part. Except for the case where the heating value of the electric part is maximized as in the rapid acceleration section, the heating value of the electric part was not large during most of the traveling time in the case such as the acceleration section or the fastest traveling. However, there has been a problem in that the conventional thermal management system for the electric vehicle is designed in preparation for the case where the heating value of the electric part for the electric vehicle is the highest, such that many separate parts are required and it is inefficient. Therefore, in order to solve the above problem, the present disclosure is arranged with the heat transfer line.

The heat transfer line 20 has first and second sides connected to the electric part core and the heating core H, respectively, to be heat-transferable so that heat of the electric part 30 is transferred to the heating core H, thereby allowing the electric part 30 to dissipate the heat through the heating core H. Therefore, it is possible to dissipate the heat from the electric part 30 by using the heating core H arranged in the interior air conditioning part 10, thereby adjusting the temperature of the interior space of the vehicle and adjusting the heat-dissipation of the electric part 30. As a result, since one system may adjust the temperature of the interior space of the vehicle and the heat-dissipation of the electric part, the parts for the system are less than those for the conventional thermal management system for the electric vehicle. As a result, it is possible to reduce the cost for manufacturing the electric vehicle, and reduce the overall layout for the thermal management system as compared with the conventional electric vehicle.

The electric part core may be a heat dissipating part arranged integrally with the electric part 30, or may also be a heat dissipating part arranged separately from the electric part 30 to be heat-transferable. As an embodiment, in FIG. 4, a motor, etc. is disposed in the electric part 30 of the right side thereof, and an oil cooler L serves as the electric part core, and the electric part 30 on the lower side thereof is connected with the heat transfer line 20 and the heat dissipating part coupled integrally with the electric part such as an inverter serves as the electric part core. Meanwhile, in the oil cooler L, refrigerant such as oil is circulated in a refrigerant line arranged with the oil cooler L through a third pump P3 and the heat of the electric part 30 is transferred to the oil cooler L. Then, the heat of the oil cooler L is transferred to the heating core H through the heat transfer line 20 connected to the oil cooler L.

Meanwhile, in the present disclosure, as shown in FIG. 2, the cooling core C may comprise an evaporator and is connected with the refrigerant line including a compressor E, a condenser D, and an expansion valve V. The refrigerant is circulated inside the refrigerant line. The refrigerant circulates the refrigerant line and flows into the cooling core C through the compressor E, the condenser D, and the expansion valve V to circulate a cooling cycle. Then, the air passing through the cooling core C, which is an evaporator, is cooled by heat-exchanging with the refrigerant inside the cooling core C.

Then, the heating core H may comprise a radiator and is connected to a first coolant line including a first pump P1 and an electric heater T. Coolant flows inside the first coolant line, and the coolant is circulated through the first pump P1. The coolant is heated through the electric heater T, and heat-exchanged with the air passing through the heating core H in the heating core H that is a radiator. Therefore, the air passing through the heating core H is heated. Then, the heat generated by the heat-generation of the electric part 30 is dissipated from the heating core H, thereby utilizing the waste heat of the electric part 30. Therefore, it is possible to utilize the waste heat of the electric part 30, thereby increasing the thermal efficiency.

Meanwhile, the heat transfer line 20 of the present disclosure may comprise a heat pipe 20a. More specifically, the heating core H may be disposed above the electric part 30 with respect to a height direction of the vehicle. When the heating core H is disposed above the electric part 30, the heat of the electric part 30 is transferred only to the heating core H due to the heat transfer characteristic of the heat pipe 20a. This is because the fluid in the liquid state inside the heat pipe 20a is placed at the electric part 30 side disposed under the heating core H by gravity.

Therefore, the heat transfer line 20 comprises the heat pipe 20a, thereby increasing the heat transfer rate from the electric part 30 to the heating core H. In addition, even when the electric part 30 does not have a temperature higher than that of the heating core H, the heating core H is disposed above the electric part 30, thereby preventing the heat of the heating core H from being transferred to the electric part 30.

Meanwhile, as shown in FIG. 6, in a thermal management system for an electric vehicle according to another embodiment of the present disclosure, the heat transfer line 20 comprises a second pump P2 and a second coolant line connected to the heating core H, and the electric part core is disposed in the second coolant line so that the heat of the electric part 30 may be transferred to the heating core H. As described above, the coolant flows inside the second coolant line through the second pump P2 to recover the heat of the electric part 30 and transfer it to the heating core H. The flow path of the first coolant line and the flow path of the second coolant line may be separately disposed in the heating core H to heat-exchange with the air passing through the heating core H, respectively or the flow path of the first coolant line and the flow path of the second coolant line are superimposed to heat-exchange with the air passing through the heating core H.

Then, as shown in FIG. 5, a thermal management system for an electric vehicle according to still another embodiment of the present disclosure further includes a heat exchanger X arranged between the cooling core C and the heating core H of the interior air conditioning part 10, and the heat transfer line 20 has first and second sides connected to the electric part core and the heat exchanger X, respectively, to be heat-transferable so that the heat of the electric part 30 is transferred to the heat exchanger X, thereby allowing the electric part to dissipate the heat through the heat exchanger X.

As an embodiment of the heat exchanger X, a radiator, etc. may be utilized, and the air flowing into the heat exchanger X is heated by heat-exchanging with the heat exchanger X. Therefore, the heat of the electric part 30 may be dissipated through the heat exchanger X. Then, the air having passed through the heat exchanger X may be heated to be discharged into the interior space of the vehicle.

Meanwhile, in the present disclosure, as shown in FIGS. 2 to 6, a flow space F is formed at the side of the heating core H of the interior air conditioning part 10, and according to control of the adjustment door 16, the air may pass through the cooling core C and then flow to the air discharge part 14 only through the flow space F, the air may pass through the cooling core C and then flow to the air discharge part 14 only through the heating core H, or the air may pass through the cooling core C and then flow to the air discharge part 14 through the flow space F and the heating core H.

When the adjustment door 16 is disposed as shown in FIG. 4, the air flowing into through the air inflow part 12 passes through the cooling core C and then flows to the air discharge part 14 only through the flow space F (path "A2"). In this case, the air does not pass through the heating core H. Then, when the adjustment door 16 is disposed as shown in FIG. 3, the air flowing into through the air inflow part 12 passes through the cooling core C and then flows to the air discharge part 14 only through the heating core H (path "A1"). In this case, the air does not pass through the flow space F. In addition, when the adjustment door 16 is disposed as shown in FIG. 6, the air flowing into through the air inflow part 12 may pass through the cooling core C and then flow to the air discharge part 14 through the flow space F and the heating core H (paths "A3" and "A4"). Therefore, the air in various modes may be discharged into the interior space of the vehicle according to control of the passenger. For example, the air cooled only through the cooling core may be discharged into the interior space of the vehicle, the air heated by using only the heating core without operating the cooling core may be discharged into the interior space of the vehicle, the air heated and dehumidified by using the cooling core and the heating core may be discharged into the interior space of the vehicle, or as shown in FIG. 5, the air heated and the air cooled by differentiating the paths ("A3" and "A4") of the air inside the interior air conditioning part may be mixed to be also discharged into the interior space of the vehicle.

Then, as shown in FIGS. 2 and 7, in the present disclosure, the cooling core C comprises an evaporator and is arranged in the refrigerant line including the compressor E, the condenser D, and the expansion valve V, and the present disclosure may further include an integrated control part 40 for controlling the operation of the refrigerant line or the first coolant line and the operation of the adjustment door 16.

More specifically, when the required cooling amount of the electric part 30 is equal to or greater than a certain value, the integrated control part 40 may control the adjustment door 16 so that the air having passed through the cooling core C flows into the heating core H. The integrated control part 40 is arranged with a thermal sensing sensor capable of measuring the temperature or the heating value of the electric part 30. Therefore, it is possible to control the adjustment door so that the air having passed through the cooling core C flows into the heating core H when the electric part 30 generates heat and the required cooling amount is a certain value or more, thereby heat-dissipating the electric part 30 through the heating core H. In this case, as shown in FIG. 3, the adjustment door 16 is disposed to close the flow space F. Therefore, all the air flowing into the interior air conditioning part 10 is guided to enter the heating core H (path "A1"). As a result, the heat of the electric part 30 is dissipated by the air passing through the heating core H. This is a mode used when the required cooling amount of the electric part 30 is large, such as rapid acceleration. The certain value of the required cooling amount in which this mode is used may be set differently according to the design of the vehicle and electric part 30. Then, when the temperature of the interior space of the vehicle is cooled, the integrated control part 40 may control the refrigerant line to be operated. Therefore, the refrigerant line is operated and the refrigerant cooled by the cooling core C is supplied, and the cooled refrigerant may be heat-exchanged with the air flowing into the interior air conditioning part 10, thereby discharging the cooled air into the interior space of the vehicle. In this case, the first coolant line is not operated. Therefore, it is possible to discharge the cooled air into the interior space of the vehicle, and at the same time, dissipate the heat the electric part 30. Then, since the cooled air flows into the heating core H, the electric part 30 may further dissipate the heat.

Meanwhile, referring to FIGS. 2 and 3, when the heating value of the electric part 30 is smaller than a certain value and the heated air is discharged into the interior space of the vehicle, the integrated control part 40 may control the adjustment door 16 so that the air having passed through the cooling core C flows into the heating core H, and control so that the first coolant line is operated. In this case, the coolant heated through the electric heater T flows into the heating core H through the first coolant line, and the coolant flowing into the heating core H heat-exchanges with the air flowing into the interior air conditioning part 10. Therefore, the air flowing into the interior air conditioning part 10 is heated and the heated air is discharged into the interior space of the vehicle. Then, since the heating core H has been disposed above the electric part 30, the heat of the heated coolant flowing into the heating core H is not transferred to the electric part 30 due to the heat transfer characteristic of the heat pipe. Meanwhile, even in this case, when the heating value of the electric part 30 instantaneously changes to a certain value or more, the integrated control part 40 may control the first refrigerant line not to operate. In this case, the heating core H is used only for heat-dissipation of the electric part 30. This is a mode applied when the heating value of the electric part 30 instantaneously changes to a certain value or more, such as when the electric car is rapidly accelerated. Then, the heat of the electric part 30 is dissipated through the heating core H and the air having passed through the heating core H may be heated, thereby continuously discharging the heated air into the interior space of the vehicle.

Then, referring to FIGS. 2 and 4, when the heating value of the electric part 30 is smaller than a certain value and the cooled air is discharged into the interior space of the vehicle, the integrated control part 40 may control the adjustment door 16 so that the air having passed through the cooling core C does not flow into the heating core H, and control so that the refrigerant line is operated. In this case, as shown in FIG. 4, the air having passed through the cooling core C is cooled and discharged into the interior space of the vehicle. Then, since the heating value of the electric part 30 is not large, the heat of the electric part 30 may be sufficiently dissipated even if air does not flow into the heating core H.

Meanwhile, when the dehumidified air is discharged into the interior space of the vehicle, the integrated control part 40 may operate both the first coolant line and the refrigerant line. In this case, the air having passed through the cooling core C is cooled and dehumidified, and then passes through the heating core H to be heated. Therefore, the heated and dehumidified air may be discharged into the interior space of the vehicle.

According to the thermal management system for the electric vehicle of the present disclosure, it is possible to adjust the temperature of the interior space of the vehicle, and cool the electric part.

Particularly, since the waste heat of the electric part may be used, it is possible to increase the thermal efficiency of the electric vehicle.

While it has been illustrated and described with respect to the specific embodiments of the present disclosure, it will be understood by those skilled in the art that various improvements and changes of the present disclosure may be made within the technical spirit of the present disclosure as provided by the following claims.

What is claimed is:

1. A thermal management system for an electric vehicle, comprising:
    an interior air conditioning part including an air inflow part, an air discharge part, a cooling core, a heating core arranged between the cooling core and the air discharge part, and an adjustment door for selectively adjusting whether air having passed through the cooling core flows into the heating core; and
    a heat transfer line having first and second sides respectively connected to an electric part and to the heating core to be heat-transferrable, so that heat of the electric part is transferred to the heating core, thereby allowing the electric part to dissipate the heat through the heating core,
    wherein the heat transfer line comprises a heat pipe containing a fluid, and
    wherein the heating core is positioned above the electric part in a height direction of the electric vehicle.

2. The thermal management system for the electric vehicle according to claim 1,
    wherein the air inflow part of the interior air conditioning part receives exterior air or interior air of the electric vehicle, and the air discharge part is connected with an interior space of the vehicle.

3. The thermal management system for the electric vehicle according to claim 1,
    wherein the cooling core comprises an evaporator and is connected with a refrigerant line comprising a compressor, a condenser, and an expansion valve.

4. The thermal management system for the electric vehicle according to claim 1,
    wherein the heating core comprises a radiator and is connected to a first coolant line comprising a first pump and an electric heater different from the electric part.

5. The thermal management system for the electric vehicle according to claim 4,
    wherein the cooling core comprises an evaporator and is arranged in a refrigerant line comprising a compressor, a condenser, and an expansion valve, and
    further comprising an integrated control part for controlling an operation of the refrigerant line or the first coolant line and an operation of the adjustment door.

6. The thermal management system for the electric vehicle according to claim 5,
    wherein when a heating value of the electric part is equal to or greater than a certain value, the integrated control part is configured to control the adjustment door so that the air having passed through the cooling core flows into the heating core.

7. The thermal management system for the electric vehicle according to claim 6,
    wherein when cooled air is discharged into an interior space of the vehicle, the integrated control part is configured to control the refrigerant line to operate.

8. The thermal management system for the electric vehicle according to claim 5,
    wherein when a heating value of the electric part is smaller than a certain value and heated air is discharged into an interior space of the vehicle, the integrated control part is configured to control the adjustment door so that the air having passed through the cooling core flows into the heating core, and controls the first coolant line to operate.

9. The thermal management system for the electric vehicle according to claim 8,
wherein when the heating value of the electric part is changed to the certain value or more, the integrated control part is configured to control a first refrigerant line not to operate.

10. The thermal management system for the electric vehicle according to claim 5,
wherein when a heating value of the electric part is smaller than a certain value and the cooled air is discharged into the interior space of the vehicle, the integrated control part is configured to control the adjustment door so that the air having passed through the cooling core does not flow into the heating core, and controls the refrigerant line to operate.

11. The thermal management system for the electric vehicle according to claim 1,
wherein the heat transfer line comprises a second pump and a second coolant line connected to the heating core, and an electric part core arranged integrally with or separately from the electric part is disposed in the second coolant line so that the heat of the electric part is transferred to the heating core.

12. The thermal management system for the electric vehicle according to claim 1, further comprising a heat exchanger arranged between the cooling core and the heating core of the interior air conditioning part,
wherein the heat transfer line has the first and second sides respectively connected to an electric part core arranged integrally with or separately from the electric part and the heat exchanger to be heat-transferrable, so that the heat of the electric part is transferred to the heat exchanger, thereby allowing the electric part to heat-dissipate through the heat exchanger.

13. The thermal management system for the electric vehicle according to claim 1,
wherein a flow space is formed at a side of the heating core of the interior air conditioning part such that the air passes through the cooling core and then flows to the air discharge part only through the flow space, the air passes through the cooling core and then flows to the air discharge part only through the heating core, or the air passes through the cooling core and then flows to the air discharge part through the flow space and the heating core according to control of the adjustment door.

* * * * *